United States Patent
Shiratsuchi

(10) Patent No.: US 10,023,162 B2
(45) Date of Patent: Jul. 17, 2018

(54) AUTOMATIC TRAIN OPERATION SYSTEM AND BRAKE CONTROL DEVICE

(71) Applicant: Mitsubishi Electric Corporation, Chiyoda-ku (JP)

(72) Inventor: Koji Shiratsuchi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/507,873

(22) PCT Filed: Aug. 24, 2015

(86) PCT No.: PCT/JP2015/073728
§ 371 (c)(1),
(2) Date: Mar. 1, 2017

(87) PCT Pub. No.: WO2016/035597
PCT Pub. Date: Mar. 10, 2016

(65) Prior Publication Data
US 2017/0305396 A1    Oct. 26, 2017

(30) Foreign Application Priority Data
Sep. 5, 2014    (JP) .................................. 2014-181580

(51) Int. Cl.
*B60T 7/00*    (2006.01)
*B60T 8/17*    (2006.01)
(Continued)

(52) U.S. Cl.
CPC .............. *B60T 8/1705* (2013.01); *B60T 7/12* (2013.01); *B60T 8/172* (2013.01); *B60T 8/3235* (2013.01); *B60T 8/58* (2013.01); *B61L 23/14* (2013.01)

(58) Field of Classification Search
None
See application file for complete search history.

(56) References Cited

U.S. PATENT DOCUMENTS

| 4,208,717 A | * | 6/1980 | Rush | B61L 3/225 246/182 B |
| 4,410,154 A | * | 10/1983 | Matty | B61L 3/008 246/182 B |

(Continued)

FOREIGN PATENT DOCUMENTS

| JP | 54-86110 A | 7/1979 |
| JP | 54-95405 A | 7/1979 |

(Continued)

OTHER PUBLICATIONS

International Search Report dated Nov. 24, 2015 in PCT/JP2015/073728 filed Aug. 24, 2015.

(Continued)

*Primary Examiner* — Jonathan M Dager
(74) *Attorney, Agent, or Firm* — Oblon, McClelland, Maier & Neustadt, L.L.P.

(57) ABSTRACT

There is provided an automatic train operation system which can stop a train precisely at a stop target position without worsening ride quality even with the control system being a discrete system. The automatic train operation system comprises a relative distance measuring device to acquire information about a relative distance of the train relative to a stop position of a station to output average distance information that is the average of relative distances and a brake control device. The brake control device includes a sensor information holding unit to hold speed information and position information detected by sensors to output; a correction amount computing unit to compute a specifying value correction amount to output; and an instruction planning unit to compute a deceleration specifying value based on the specifying value correction amount and sensor information.

8 Claims, 13 Drawing Sheets

(51) Int. Cl.
*B60T 7/12* (2006.01)
*B60T 8/172* (2006.01)
*B60T 8/32* (2006.01)
*B60T 8/58* (2006.01)
*B61L 23/14* (2006.01)

(56) References Cited

U.S. PATENT DOCUMENTS

| | | | | |
|---|---|---|---|---|
| 5,174,212 | A * | 12/1992 | Judy | B61J 3/06 104/162 |
| 5,828,979 | A * | 10/1998 | Polivka | B61L 27/0016 701/117 |
| 5,978,718 | A * | 11/1999 | Kull | B61L 3/008 246/167 R |
| 6,135,396 | A * | 10/2000 | Whitfield | B61L 3/125 246/167 R |
| 7,395,141 | B1 * | 7/2008 | Seck | B61C 17/12 246/182 R |
| 9,669,853 | B2 * | 6/2017 | Kurita | B60L 15/40 |
| 2007/0219680 | A1 * | 9/2007 | Kumar | B61L 3/006 701/19 |
| 2009/0090818 | A1 * | 4/2009 | Kumar | B61L 3/006 246/186 |
| 2012/0265379 | A1 * | 10/2012 | Chen | B61L 3/006 701/20 |
| 2013/0277505 | A1 * | 10/2013 | Kumar | B61L 3/006 246/186 |
| 2013/0297163 | A1 * | 11/2013 | Kull | B60T 7/18 701/70 |
| 2014/0049408 | A1 * | 2/2014 | Morimoto | B61L 15/0072 340/988 |
| 2014/0188375 | A1 * | 7/2014 | Kumar | B60L 15/38 701/117 |
| 2015/0168158 | A1 * | 6/2015 | Mathews, Jr. | G01C 21/26 701/400 |
| 2016/0185326 | A1 * | 6/2016 | Brooks | B60T 8/171 701/19 |
| 2016/0362022 | A1 * | 12/2016 | Mathews, Jr. | B60L 15/2018 |
| 2017/0203745 | A1 * | 7/2017 | Kumar | B60T 17/228 |
| 2017/0232943 | A1 * | 8/2017 | Brooks | B61G 5/02 701/19 |

FOREIGN PATENT DOCUMENTS

| | | |
|---|---|---|
| JP | 61-231807 A | 10/1986 |
| JP | 1-185106 A | 7/1989 |
| JP | 4-8661 A | 1/1992 |
| JP | 4-42061 A | 2/1992 |
| JP | 4-151371 A | 5/1992 |
| JP | 5-249127 A | 9/1993 |
| JP | 9-200910 A | 7/1997 |
| JP | 2000-326849 A | 11/2000 |
| JP | 2001-191920 A | 7/2001 |
| JP | 2002-271918 A | 9/2002 |
| JP | 2003-230206 A | 8/2003 |
| JP | 2003-285740 A | 10/2003 |
| JP | 2004-224220 A | 8/2004 |
| JP | 2006-6030 A | 1/2006 |
| JP | 2006-240593 A | 9/2006 |
| JP | 2007-110888 A | 4/2007 |
| JP | 2008-278645 A | 11/2008 |
| JP | 2009-73397 A | 4/2009 |
| JP | 2013-10477 A | 1/2013 |
| WO | 2011/055470 A1 | 5/2011 |

OTHER PUBLICATIONS

Office Action dated Apr. 19, 2016 in JP 2016-510541 filed Apr. 7, 2016 (with English translation).

* cited by examiner

AUTOMATIC TRAIN OPERATION SYSTEM AND BRAKE CONTROL DEVICE

FIELD

The present invention relates to an automatic train operation system.

BACKGROUND

Conventionally, in stopping a train at a station, it is required to stop a car precisely at a target spot such as a station by controlling a brake force generating device such as a regenerative brake by a motor and an air brake using frictional force. Further, in brake control of a train, it is also required to stop it precisely at a target spot without damaging ride quality. However, it takes a very high skill to stop a train precisely at a target spot by operation of a driver. Thus, in these years, automatic control devices such as an automatic train operation (ATO) and a train automatic stop-position controller (TASC) are being put in for use.

In train automatic control, because the accuracy of the stop position varies due to variation in brake characteristics and variation in train resistance that is an external factor, first the brake characteristics and train resistance of the train should be considered. Here, the train resistance is the sum of running resistance, curvature resistance, and gradient resistance. As the brake characteristics, there can be cited a dead time that is a response time until brake force occurs and a first-order lag, variation in a mechanical friction characteristic that is variation in the deceleration characteristic of a train at the time of braking while running, the influence of a hysteresis characteristic of brake pressure, the influence of weather, wind speed, and a gradient that is variation in the speed characteristic due to environmental factors, and the influence of age deterioration and changes over time in these. As obvious from dynamics representing relations between force, mass, and acceleration, deceleration varies depending on car weight even if the same brake force is applied. That is, the brake characteristics are subject to a modeling error and model fluctuation, i.e., variation. In order to deal with these factors which affect the brake characteristics, a technique has been proposed which uses, in combination, a means of planning a brake pattern based on a prediction model created beforehand from data about previous runs for the train to run and a means of performing model estimation using spot information from transponders and speed information from a speed electric generator as data about actual runs for improving prediction accuracy so as to improve the accuracy of the prediction model.

Although increase/decrease in the number of passengers causes variation in the mass of the train, a variable load device need only be installed to deal with variation in the mass of the train due to increase/decrease in the number of passengers. The variable load device is one which adjusts brake force in response to increase/decrease in the load, thereby adjusting deceleration according to a specifying value to be constant regardless of the mass of the train.

For example, Patent Literature 1 addresses "performing deceleration control with good responsiveness and followingness at the stage of deceleration control before going into position control for aligning stop position". Patent Literature 1 discloses an automatic train operation device where "An object system deducing unit 40, taking into account the dead time of the object system estimated by a dead time estimating unit 50, deduces the object system of a fixed-position stop control system. A control parameter computing unit 70 computes control parameters to match the object system taking into account that dead time. A principle control unit 60 performs deceleration control using the control parameters, so that the fixed-position stop control is possible with the dead time of the object system being taken into account". In Patent Literature 1, with the dead time, load weight, and weather out of the brake characteristics being taken into account, variation in the brake characteristics is dealt with by estimating the dead time of the object, controlling with use of a Smith dead time compensator utilizing the estimated dead time, and by using control parameter settings in which the weather and load weight have been taken into account.

Further, for example, Patent Literature 2 addresses "making the stop position error small even when an error exists in the prediction model of the automatic train operation device". Patent Literature 2 discloses an automatic train operation device where "A stopping plan is created at the start of fixed-position stop control and is reviewed periodically with as short a period as a control period while the train is running, thereby killing the influence of the error in the prediction model as much as possible before it becomes large so as to make the stop position error small. In addition, brake-torque estimation is performed to correct the brake torque value of the prediction model, thereby making the prediction model error smaller and thus the stop position error smaller, and in which further if the predicted value of the stop position error is a value of the same order each time the stop position error is predicted based on the stopping plan reviewed during the preceding control period, the stop target position is displaced accordingly in the opposite direction, thereby making the stop position error smaller". In Patent Literature 2, such a stop pattern as to minimize the error between the planned stop position computed from a model predicted from train behavior data and the planned stop position computed from a current running plan is created based on actual deceleration.

CITATION LIST

Patent Literature

Patent Literature 1: Japanese Patent Application Laid-open Publication No. H09-200910

Patent Literature 2: Japanese Patent Application Laid-open Publication No. 2002-271918

SUMMARY

Technical Problem

However, according to the conventional techniques, a problem may occur in the accuracy of the stop position and ride quality. For example, although according to Patent Literature 1 the gain adjustment and the dead time can be adjusted to be optimal with a continuous system, with the control system being instead such a discrete system as uses notch specifying values, there is the problem that hunting occurs to worsen ride quality. Further, for example, according to Patent Literature 2, there is the problem that a deviation occurs between the stop target position realized by the control system and the actual stop target position because, if sensor information includes a transmission lag or noise, actual deceleration information becomes inaccurate as current information, so that it cannot stop precisely at the actual stop target position. The notch will be described later.

The present invention was made in view of the above facts, and an object thereof is to provide an automatic train operation system which can stop a train precisely at the stop target position without worsening ride quality even with the control system being a discrete system.

Solution to Problem

In order to solve the problems and achieve the object, according to an aspect of the present invention, there is provided an automatic train operation system including: a relative distance measuring device to acquire information about a relative distance of a train relative to a stop position of a station to output average distance information that is an average of relative distances; and a brake control device, wherein the brake control device includes: a sensor information holding unit to hold and output speed information and position information detected by sensors; a correction amount computing unit to compute a specifying value correction amount from the speed information, the position information, and the average distance information to output the specifying value correction amount; and an instruction planning unit to compute a deceleration specifying value from the speed information, the position information, and the specifying value correction amount, to generate a notch specifying value corresponding to the deceleration specifying value, and to generate a brake specifying value from target deceleration corresponding to the notch specifying value based on the notch specifying value or a deceleration model for each notch to output the brake specifying value to the brake device.

Advantageous Effects of Invention

The present invention produces the effect of being able to provide an automatic train operation system which can stop a train precisely at the stop target position without worsening ride quality even with the control system being a discrete system.

DESCRIPTION OF EMBODIMENTS

Automatic train operation systems according to embodiments of the present invention will be described in detail below with reference to the drawings. Note that these embodiments are not intended to limit the present invention.

First Embodiment

Figure 1:
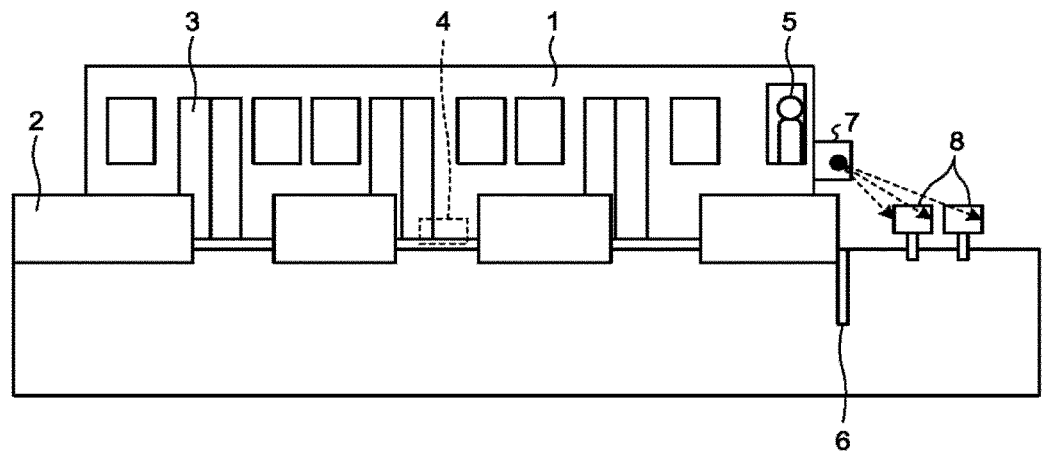
FIG. 1 is a diagram showing an example of the configuration of a train having mounted therein a brake control device applied in an automatic train operation system according to a first embodiment and the configuration of a stop station.

FIG. 1 is a diagram showing an example of the configuration of the first embodiment of a train having mounted therein a brake control device applied in an automatic train operation system according to the present invention and the configuration of a stop station. In FIG. 1, a train 1 includes doors 3, a brake control device 4, and a distance measuring device 7. By the operation of a driver 5, the train 1 is stopped at a station where platform doors 2 are provided on the platform. A stop reference position 6 is provided in the stop station and serves as a target at the time of the train 1 stopping. While the brake control device 4 stops the train 1 based on information about the distance between the reference position of the train 1 obtained from the distance measuring device 7 and the stop reference position 6. If there are elements which have not been modeled, the accuracy of the stop position decreases. Accordingly, the brake control device 4 automatically adjusts correction amounts for control parameters so as to improve the accuracy of the stop position the next time and later. A plurality of markers 8 in a plane shape shown in FIG. 1 will be described later with reference to FIG. 7.

Figure 2:
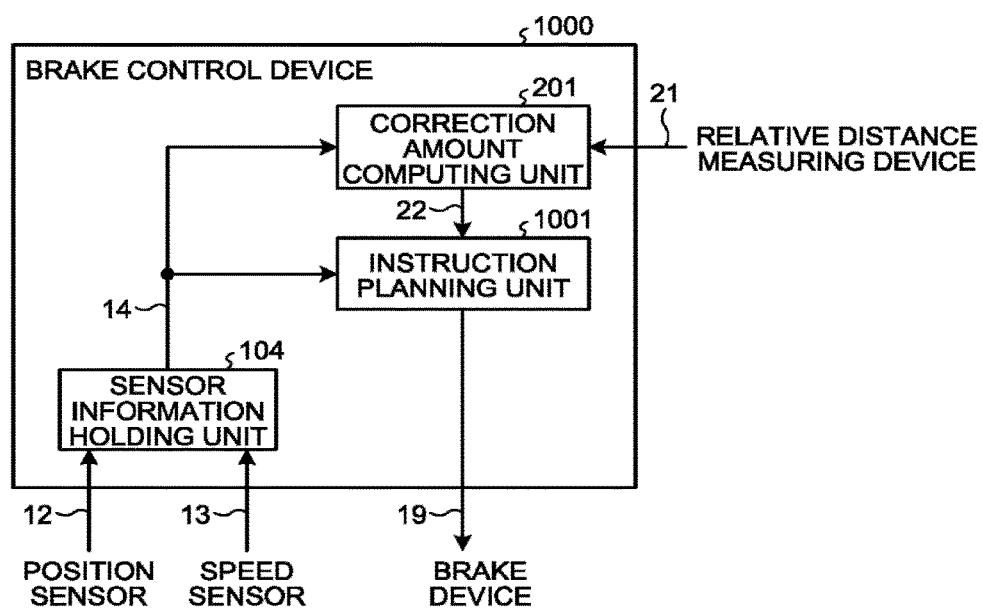
FIG. 2 is a diagram showing the configuration of the automatic train operation system according to the first embodiment.

FIG. 2 is a diagram showing a configuration of the first embodiment of the automatic train operation system according to the present invention. The automatic train operation system shown in FIG. 2 includes a brake control device 1000 and a relative distance measuring device 203. The brake control device 1000 includes a sensor information holding unit 104, a correction amount computing unit 201, and an instruction planning unit 1001.

Position information 12 from a position sensor mounted in the train 1 and speed information 13 from a speed sensor mounted in the train 1 are inputted to the sensor information holding unit 104. The sensor information holding unit 104 outputs the position information 12 and speed information 13 held therein as sensor information 14 to the correction amount computing unit 201 and the instruction planning unit 1001.

The relative distance measuring device 203 provided outside the brake control device 1000 measures a relative distance between the train 1 and the stop target position at the time of stopping and computes the average of measured relative distances to output computed average distance information 21 to the correction amount computing unit 201.

The correction amount computing unit 201, having the sensor information 14 and the average distance information 21 inputted thereto, computes a correction amount to output a specifying value correction amount 22, expressed by $\beta_r + \Delta\beta$, to the instruction planning unit 1001.

The instruction planning unit 1001 computes deceleration to be outputted by a brake device, using a deceleration model obtained by further adding a correction amount to a specifying value obtained, taking into account brake characteristics, from the sensor information 14 and the specifying value correction amount 22 so as to generate a brake specifying value 19 from the computed instruction deceleration to output. Further, for the train 1 whose operation is being controlled with use of the brake specifying value 19, the instruction planning unit 1001, taking into account an error due to the current state, corrects the specifying value given from the instruction planning unit 1001 on line and outputs a brake specifying value derived from target deceleration corresponding to a notch specifying value based on the notch specifying value or a deceleration model for each notch to the brake device. Here, the deceleration model can be defined as, e.g., a model having a relation where deceleration increases linearly for each of the notches. Here, the brake specifying value, which is an instruction to be inputted to the brake control device mounted in the brake device, is an electrical signal corresponding to the target deceleration. As such an electrical signal, there can be cited a notch specifying value, a deceleration specifying value corresponding to the notch specifying value or a voltage value corresponding to the notch specifying value.

In the configuration shown in FIG. 2, the relative distance measuring device 203 acquires information about the relative distance between the train 1 and the stop target position when stopped, and the acquired information is used to generate control specifying values for the next time and later. The relative distance information can be acquired by using a distance measuring instrument using, e.g., a linear encoder, a grid encoder, a laser displacement sensor, or a link structure. If the distance between the reference position of the train and the stop target point can be computed from distance information acquired through such a distance measuring instrument, this distance information is directly used. Note that the relative distance information can also be computed from position information of two points defined on the same coordinate system. Hence, as to distance information, position information may be acquired by using a unit that acquires position information, and relative distance information may be computed from that position information.

Or if a plurality of distance information represented by a two-dimensional line laser are used, markers located on the body of the lead car of a train or the stop target point of a station may be measured, and an approximate curve may be estimated from a group of points as the measuring results, and distances between the estimated approximate curve and the stop target point of the station or distances between the reference position of the train and the markers may be obtained. For example, the least-squares method can be used in estimating the approximate curve.

Here, the stop target point is a marker provided in a station and is a reference point for the train driver or ATO to stop the train at a predetermined position. Meanwhile, the reference position of the train is a position which a user, who applies the automatic train operation system of the present invention, sets on part of a car of the train. When the stop target point is located on a straight line extending through the reference position of the train in the direction of the normal to a car side surface of the train, the relative distance is set at zero. If the marker and the stop target point are not at the same position but are offset, the relative distance for when the stop point is located on a straight line extending in the direction of the normal to a car side surface of the train, may be set to have an offset, not at zero.

Herein, the shortest distance between a straight line extending in the direction of the normal to a car side surface of the train and the stop target point is computed as the relative distance. Note that the target point may be not a point but a line segment. In this case, an end point on the line segment as the target at the shortest distance from the straight line extending in the direction of the normal to the car side surface of the train or an end point closer to the train of the line segment as the target is determined as a representative point on the line segment that is the target, and the relative distance to the reference position of the train should be defined.

Figure 3:
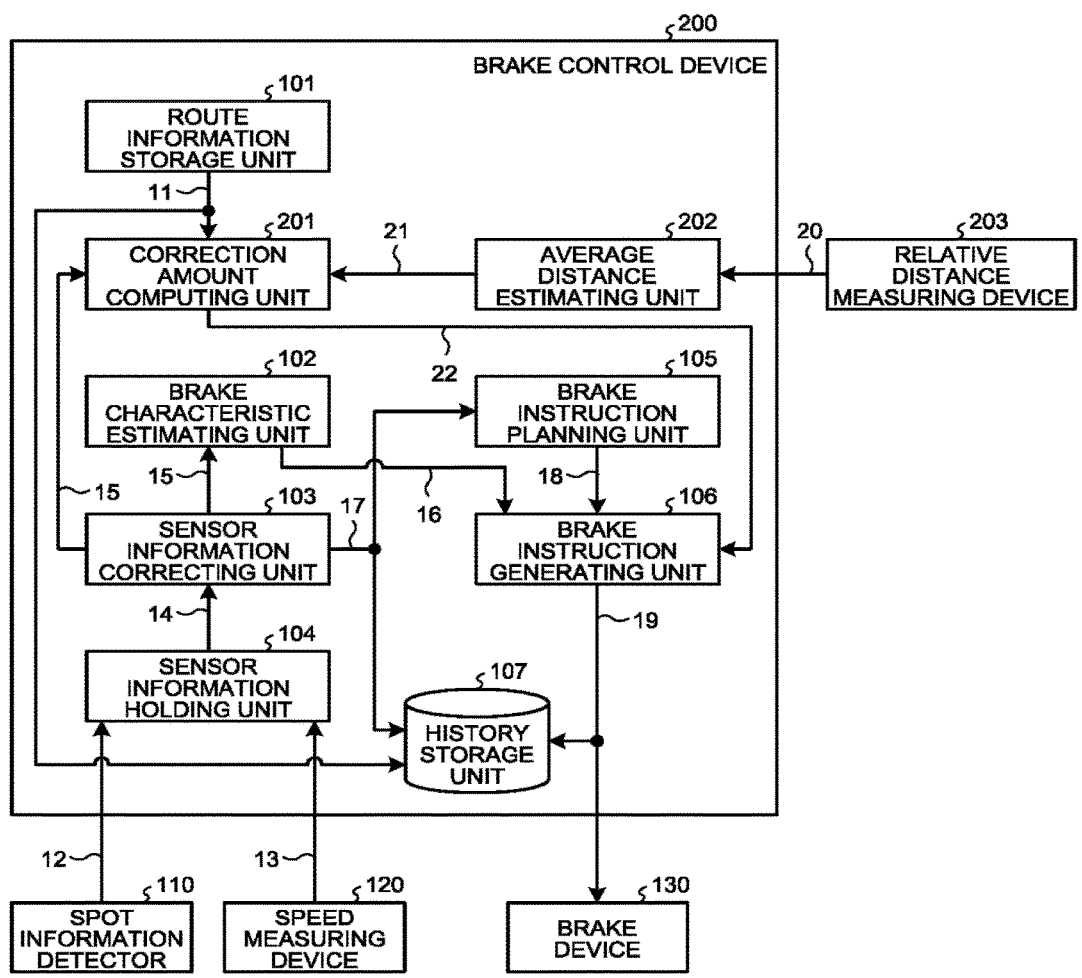
FIG. 3 is a diagram showing the detailed configuration of the automatic train operation system according to the first embodiment.

FIG. 3 is a diagram showing an example detailed configuration of the first embodiment of the automatic train operation system according to the present invention. The automatic train operation system shown in FIG. 3 includes a brake control device 200, a relative distance measuring device 203, a spot information detector 110, a speed measuring device 120, and a brake device 130. The spot information detector 110 is a position sensor, and the speed measuring device 120 is a speed sensor.

The brake control device 200 includes a route information storage unit 101, a correction amount computing unit 201, an average distance estimating unit 202, a brake characteristic estimating unit 102, a sensor information correcting unit 103, a sensor information holding unit 104, a brake instruction planning unit 105, a brake instruction generating unit 106, and a history storage unit 107.

The route information storage unit 101 stores route information 11, especially gradients and curvatures which make the train deceleration change due to the influence of gravity and friction in the route and outputs the route information 11 to the correction amount computing unit 201 and the history storage unit 107.

The relative distance measuring device 203 provided outside the brake control device 200 measures the relative distance between the train 1 and the stop target position when stopped and outputs stop distance information 20.

The average distance estimating unit 202 estimates a population mean of stop distance information 20 from a plurality of stop distance information 20 that are outputted by the relative distance measuring device 203 and outputs average distance information 21.

The position information 12 from the spot information detector 110 and the speed information 13 from the speed measuring device 120 are inputted to the sensor information holding unit 104. The sensor information holding unit 104 holds the position information 12 and the speed information 13 and outputs the position information 12 and speed information 13 as sensor information 14 to the sensor information correcting unit 103.

The sensor information correcting unit 103, having the sensor information 14 inputted thereto, estimates current speed and current position to output them as current state amount information 15 to the correction amount computing unit 201 and the brake characteristic estimating unit 102 and also to output corrected sensor information 17 obtained by correcting the sensor information 14. Here, the current state amount information 15 is position information and speed information obtained by estimating the true current position taking into account the transmission lag related to sensing or a filter lag. The corrected sensor information is, for example, position information and speed information where a state amount in the future by the response delay time later is estimated based on a response delay time at the time of issuing a specifying value, that is, a dead time or a first-order lag response time. If the state amount in the future cannot be estimated, the current state amount may be used instead of the corrected sensor information.

The brake characteristic estimating unit 102, having the current state amount information 15 inputted thereto, estimates brake characteristics 16 including a delay time and a response delay that is a hysteresis characteristic and outputs the brake characteristics 16 to the brake instruction generating unit 106.

The brake instruction planning unit 105, having the corrected sensor information 17 inputted thereto, outputs a planned specifying value 18 that is a specifying planned value expressed by $\beta_i$–$\beta_r$, computed using the corrected sensor information 17.

The correction amount computing unit 201, having the route information 11, the average distance information 21, and the current state amount information 15 inputted thereto, computes a specifying value correction amount 22 to output to the brake instruction generating unit 106. Specifically, for the range of the current state amount satisfying a condition, the computing unit 201 corrects the specifying value correction amount for use in instruction computation, using history information of the average distance information 21 that is estimated population mean information, gradient information and curvature information of the rail track at the current spot obtained from the route information 11, and estimated current state amount information 15. Here, only for the range of the distance relative to the stop target point from L1 meters to L2 meters, which is an example of the condition, a deceleration specifying value correction amount is computed as the specifying value correction amount, where L1>L2.

The brake instruction generating unit 106, having the brake characteristics 16, the planned specifying value 18, and the specifying value correction amount 22 inputted thereto, generates the brake specifying value 19 to output to the history storage unit 107 and the brake device 130. The brake instruction generating unit 106 outputs a planned specifying value corrected by a specified correction amount based on the planned specifying value for the current state obtained based on the corrected sensor information 17.

The history storage unit 107 stores history information of the brake specifying values 19, the route information 11, and the corrected sensor information 17. The brake device 130 operates in such a way as to follow deceleration corresponding to the brake specifying value 19.

Here, in order to describe the features of the present invention, first a conventional technique will be described. In general, when a train is stopped at a station, the train is controlled by operation of the driver such that the train stops accurately with respect to a reference so that the positions of doors of the train are level with those of platform doors installed in the station. However, where platform doors are installed in the station, the stop position of the train being inaccurate may cause a large delay. Thus, high skill is required of drivers while the psychological burden is large. Accordingly, in these years, ATOs or TASCs are being developed which are brake control devices to make a train automatically stop at a precise position of a station. In ATOs or TASCs, from the viewpoint of ride quality and the accuracy of the stop position, it is general to adopt a control method which makes an object follow a target speed pattern. That is, in control by the ATO or TASC, an error between the target speed pattern and detected values acquired by a speed sensor and a position sensor are computed, and the brake control device outputs instructions to make the brake device operate, thereby making the error approach zero. Here, the object controlled by the brake control device is brake force, that is, brake pressure and brake torque. A specifying value of that is specified by not a continuous value but a notch that is a discrete value. Unless the brake control device appropriately selects notch specifying values suitable to follow a target value for the brake device, hunting may occur. For the brake, the notch is a discrete value which takes on, e.g., seven levels indicated by B1 to B7, and greater numbers signify greater deceleration.

Because the response of train brake control is slow, it is effective to perform feed forward instruction generation that generates specifying values to satisfy required results in advance using a response model of the train in approaching the target value.

Figure 4:
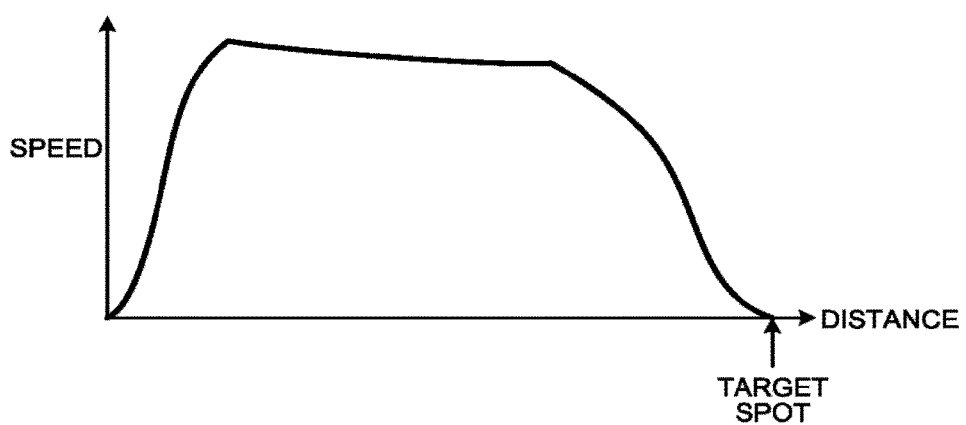
FIG. 4 is a graph showing an acceleration/deceleration pattern of a general train.
Figure 5:
FIG. 5 is a graph showing a power running notch in FIG. 4.
Figure 6:
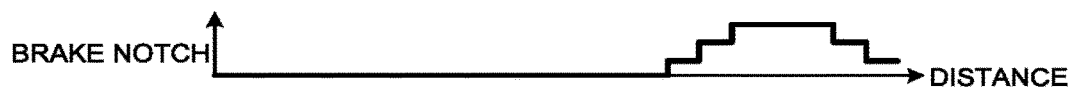
FIG. 6 is a graph showing a brake notch in FIG. 4.

There are two points to consider in modeling the response of a train. First, modeling the brake characteristics of the brake device and specifying values need to be considered. Second, deviation of train deceleration from specifying values due to external force exerted by the external environment needs to be considered. A general brake control device that has been modeled will be described considering these two points. FIGS. 4, 5, and 6 are graphs showing an acceleration/deceleration pattern of a general train. Here, the train moving between stations operates to draw a speed pattern with respect to distance or position shown in FIG. 4. In FIG. 4, the spots where speed is zero are the start spot and stop spot. FIG. 5 is a graph showing a power running notch corresponding to FIG. 4, and FIG. 6 is a graph showing a brake notch corresponding to FIG. 4. The power running notches discretely denote specifying values at acceleration; the brake notches discretely denote specifying values at deceleration; and both of them are generally adopted in trains from the viewpoint of reproducibility of manual operation. In operation according to the speed pattern shown in FIG. 4, control at deceleration is important because the accuracy of the stop position is determined by braking just before stopped.

A conventional brake control device has a configuration different from that of the brake control device 200 shown in FIG. 3 in that the correction amount computing unit 201 and the average distance estimating unit 202 are excluded. In the conventional brake control device, speed information from the speed measuring unit and spot information from a transponder that is an example of the spot information detector continue to be stored into the buffer memory of the sensor information holding unit 104. Further, the sensor information correcting unit performs filtering on these speed information and spot information so as to reduce the influence of noise. In the filtering, movement average processing and low-pass filtering are performed on a history of multiple sensor information stored in the buffer memory. The history of sensor information subjected to the filtering in the sensor information correcting unit 103 is inputted to the brake characteristic estimating unit 102, and the brake characteristic estimating unit 102 can estimate a delay time or dead time that is the response of the brake from deceleration information.

The brake characteristics include the hysteresis characteristic of brake deceleration when the notch is changed and variation in various characteristics. Information about the brake characteristics estimated by the brake characteristic estimating unit 102 is stored into the brake instruction generating unit 106. Estimation in the brake characteristic estimating unit 102 is often performed under the hypothesis that the brake response is approximated as a first-order lag system. On the basis of acquired data, a rise time, a dead time, or pressure of a steady state, torque, deceleration, or acting force are estimated.

Based on the route information 11 stored in the route information storage unit 101, the brake instruction generating unit 106 computes the quantity of deceleration on which gradients and curvatures of the route act, so as to consider its influence. The brake instruction generating unit 106 computes a deceleration specifying value to be outputted by using the brake characteristics 16, the planned specifying value 18, and the specifying value correction amount 22, so as to generate the brake specifying value 19 for realizing preferable accuracy of the stop position and preferable ride quality. That is, the brake specifying value 19 is generated to be such as to avoid rapid deceleration while suppressing notch variation in order to achieve preferable ride quality. Specifically, for example, in order to realize target speed $V_i$ at each target spot Pi, a way to make the notch change from the current notch state to realize target speed $V_i$ at the target spot Pi is computed based on deceleration $\beta_k$ based on current speed $V_k$ and the brake characteristics. The target speed $V_i$ is expressed in terms of current speed $V_k$ and deceleration $\beta_k$ by the following equation (1).

[Formula 1]

$$V_i = V_k + \int \beta_k dt \quad (1)$$

The above equation (1) is rewritten as the following equation (2).

[Formula 2]

$$\int \beta_k dt = V_i - V_k \quad (2)$$

By computing a timing suitable to realize the target speed at each spot calculated back from the stop point from the above equation (2) to switch the specifying value, the operation pattern can be adjusted. Here, while deceleration $\beta_k$ requires notch change of multiple steps, in order to avoid ride quality worsening due to rapid change in deceleration, the constraint condition can be set where the notch change is done for every one step at a time. In this case, in switching multiple steps, computation is performed so as to switch the notch every given time. In this way, the timing of notch change can be determined by calculating back from the target spot Pi.

If notch change is repeated just before stopped, then ride quality may worsen. Accordingly, in order to accurately realize target speed $V_i=0$ at the target spot Pi so as to suppress ride quality worsening, deceleration $\beta_i$ may be computed such that the train can stop at the final stop target position by one time of notch change, and at the timing when internal model deceleration $\beta_{mdl}$ (N) for a notch (N) coincides with the deceleration $\beta_i$, switching may be performed. At this time, the deceleration $\beta_i$ is computed from the following equation (3) by using current speed $V_k$, remaining distance $L_k$ obtained from the difference between target spot Pi and current position Pk, gradients and curvatures that are the route information, and deceleration $\beta_r$ attributed to train resistance due to air resistance.

[Formula 3]

$$\beta_i = V_k^2 / 2L_k + \beta_k \quad (3)$$

In this way, the brake specifying value may be generated assuming that the fixed deceleration $\beta_i$ is computed from the current state for the target spot Pi. In the above equation (3), by replacing the current speed $V_k$ and remaining distance $L_k$ with an estimated amount $V_{k\_est}$ of response start speed and an estimated amount $L_{k\_est}$ of remaining distance, the brake characteristics can be taken into account.

At this time, the internal model deceleration $\beta_{mdl}$ (N) obtained through parameter estimation of a model created from data from a test run or data detected by sensors at the time of business operation, deceleration $\beta_r$ attributed to train resistance, as well as current position Pk and current speed $V_k$ acquired by sensors, need to be obtained accurately. The internal model deceleration $\beta_{mdl}$ (N), which is output deceleration expected for each notch N, is expressed by a variable table or function of the number N of notches.

In the parameter estimation of the model, the delay time constant or dead time in the brake characteristics is estimated, and the output deceleration is estimated. For the model of deceleration attributed to train resistance, by fitting a deceleration characteristic at the time of coasting operation in a test run to an almost quadratic function, estimation is performed for the deceleration characteristic.

According to the method of the equation (2) and the method of the equation (3), the results may vary when the delay of sensing data and the influence of noise are taken into account. The difference between the method of the equation (2) and the method of the equation (3) is that the method of the equation (2) computes a way to make the notch change in advance, whereas the method of the equation (3) obtains deceleration to be outputted now and waits for that deceleration to coincide with model deceleration, which is expected to be outputted at a particular notch. The equation (2) takes computing cost because successive computation is performed. As to the equation (3), the computation is simple, but the equation (3) is not suitable for computation where the notch is assumed to be switched multiple times. Both the computations are affected by the delay and accuracy of acquired current position Pk and current speed $V_k$.

In addition, there is a method which provides a framework to compute a stop-planned position at which to stop in the future from current position Pk and current speed $V_k$ and controls it to switch to the notch at which the stop position accuracy of the stop-planned position is highest, in the current notch or switching notches.

Note that history information of the brake specifying value and sensor information at each time is stored in the history storage unit 107 and used in, e.g., computation by the brake characteristic estimating unit 102.

Although the control method which realizes the above two points as above can stop a train more accurately with a more elaborate model, there is a limit in elaborating a model, and in addition three problems exist.

First, if notch specifying values are used, hunting occurs due to inaccuracy of the estimation of a dead time when being close to target speed, thus worsening ride quality. Because discretized deceleration is inputted, a speed followingness characteristic for the speed error between the target speed pattern and the actual speed pattern is worse, so that accuracy of the stop position may worsen. For example, with the continuous system model of Patent Literature 1, even if the gain adjustment or the dead time is adjusted to be preferable, the problems of hunting and a quantization error occurs when notch specifying values or the control system is replaced with a discrete system. As a result, because acceleration/deceleration is repeated due to the hunting, ride quality worsens, or the quantization error cannot be compensated for, so that the stop position may deviate from the target position.

Second, if modeling is performed using position information and speed information, and control input is determined on a model basis, there is the problem that accurate modeling cannot be performed because of inaccuracy of position information and speed information. For example, speed information acquired from a speed generator is not accurate in a low speed state of several km per hour just before stopped as widely known and not suitable to be used for modeling or control. As to position information computed from position information acquired from a transponder and speed information acquired from a speed generator, the computed position is supposed to differ from the actual position since the distance from the station stop point to the transponder is not strictly ensured. Further, variation may occur in the spot detected time depending on the accuracy of the position where the on-board device receiving a signal from the transponder is installed, so that the computed position includes an error from the actual position.

Figure 8:
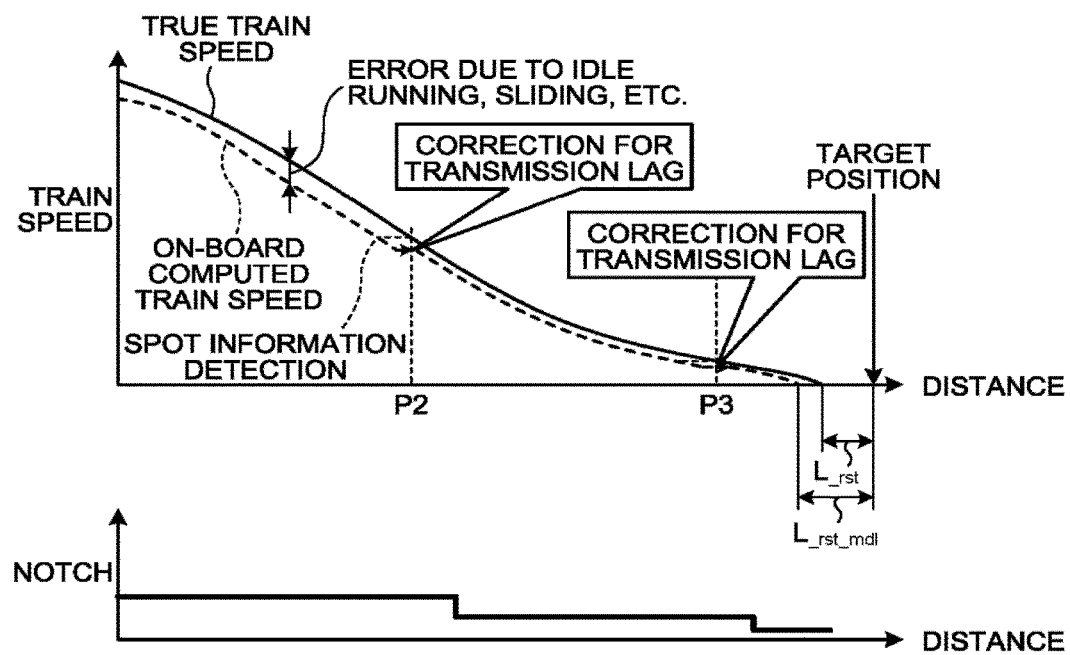
FIG. 8 is a graph showing the true train speed and on-board computed train speed where the horizontal axis represents the distance and where the vertical axis represents the train speed.
Figure 9:
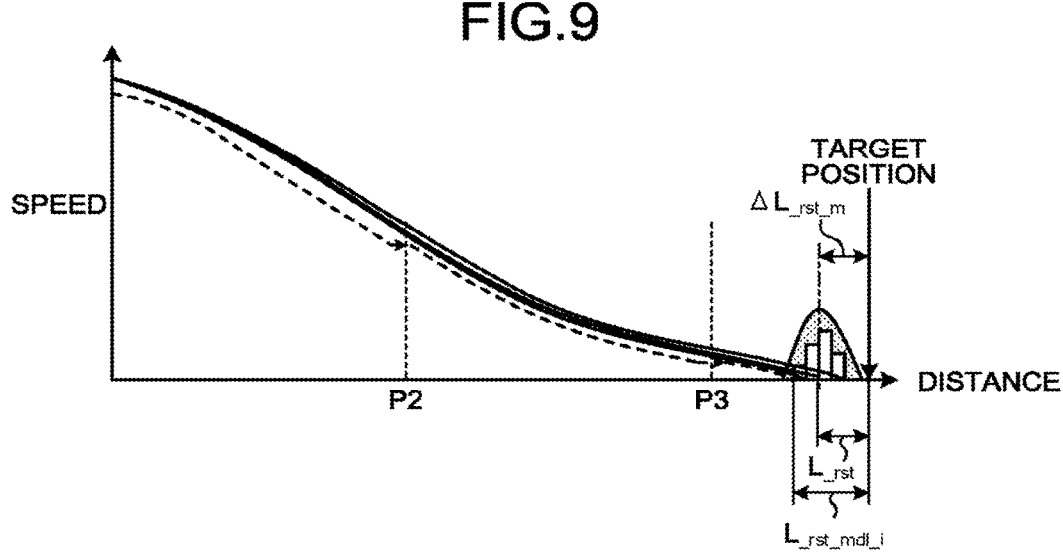
FIG. 9 is a graph showing relative distances acquired using the relative distance measuring device according to the first embodiment and the distribution thereof when trial is performed multiple times.

FIG. 8 is a graph showing the true train speed and on-board computed train speed where the horizontal axis represents the distance and where the vertical axis represents the train speed. In FIG. 8, the true train speed that is actual train speed is indicated by a solid line, and the on-board computed train speed is indicated by a dotted line. As shown in FIG. 8, at the time of spot information detection, correction for transmission lag is performed, but because of an error due to idle running and sliding, it is not ensured that the on-board computed train speed and position coincide with the true train speed.

For example, as to the on-board computed train speed, a reference signal of the true train position has an error because of the influence of the lag from the time when spot information is detected to the time when it is transmitted into the control device and the position where the transponder is installed. Thus, the position computed when receiving a signal from the transponder installed at spot P3 that is the reference position just before stopped, is different from the actual position. As a result, the relative distance $L_{\_rst\_mdl}$ from the on-board computed stop spot to the target position differs from the relative distance $L_{\_rst}$ from the actual stop spot to the target position. As such, because the design does not coincide with the actual installation and attachment situation, the actual situation does not entirely coincide with model settings. As a result, since the computed current spot contains an error, the relative distance between the train and the target spot of the station cannot be actually made at 0 cm, and thus there is the problem that accuracy of the stop position cannot be improved.

Although up to here errors in input information have been described, if a model is used in control, a modeling error of the model of an object to be controlled may cause the accuracy of the stop position to worsen. As to the brake response characteristic and deceleration characteristic that are objects to be controlled, a first-order lag, which is an example of a lag that is a brake characteristic, or a dead time and deceleration force that is a brake characteristic are modeled from speed information or specifying value information acquired in advance. Thus, for the case where specifying values are held and the case where specifying values are changed, the arrival spot when stopped can be estimated based on the brake characteristics and route information. Where the arrival spot is estimated taking into account the brake response characteristic, if a modeling error is contained, the arrival spot is likely to be over or short of the expected one. Also in a case where the deceleration characteristic varies to have hysteresis, the arrival spot is likely to be over or short as with the modeling error. Here, to be over means to stop past a target spot, and to be short means to stop before a target spot.

Third, as to curvatures and gradients of rails that change for each station interval and the stationary influence of mechanical friction that varies under the influence of these, the characteristics change in a subtle way for each station interval. If the influence of train characteristics on a brake torque model is modeled, then characteristics average for the station intervals are modeled, so that there is the problem that deceleration may not converge on the value desired to actually occur. As a result, a stationary error occurs between the target stop point and the actual stop position. Further, considering on a per composition basis, curvatures and gradients are not the same across all the cars of a composition and thus should be combined for consideration. In general, if the composition is particularly large, it is very difficult to precisely compute by what degree of deceleration it is affected for each unit distance so as to model.

As described above, in the conventional brake control device, in creating a framework to perform modeling so as to increase the accuracy of the stop position for a target spot and generating specifying values corresponding to it, errors are constantly contained as long as the reliability and real-time-ness of sensor information are not ensured.

As mentioned previously, position information, which is feedback information at the time of controlling, is reset by a transponder at a specific spot. However, as to the stop position, the true final stop position does not coincide with position information cumulated on board. That is, the problem with the conventional brake control device is as follows. If control is performed with a spot signal being a reference of position, current spot information contains an error due to the influence of the transmission lag or cumulation error. Thus, control cannot be performed so that the relative position relation between the station and the train does not contain an error in controlling so as to make the stop position accuracy error zero.

Accordingly, the brake control device of the present embodiment computes a correction amount corresponding to an error in stop position accuracy from the actual stop spot so as to reflect it in the brake specifying value 19. The error is due to errors in current state amount information including position, speed, and deceleration due to sensing noise and filtering, and a modeling error in using physical models such as brake characteristics and train resistance.

A relative distance measuring device 203 is connected to the brake control device applied to the automatic train operation system of the present embodiment as shown in FIG. 3 and can measure the relative distance between a train 1 and a station. Measuring the relative distance is performed by measuring the relative distance to a target stop position using, e.g., a distance measuring unit 7 provided in the train 1 as shown in FIG. 1. A remaining distance obtained by the relative distance measuring device 203 differs from, e.g., a remaining distance that is computed from the running distance computed from the pulse output of a speed generator with respect to the position sensor of a transponder and the spot of this position sensor. This is because the wheel rotation distance does not coincide with the travelling distance due to the accuracy of the speed generator when at low speed and a slide phenomenon. By using the relative distance measuring device 203, highly accurate relative distance information can be acquired depending on the accuracy of the relative distance measuring device 203.

Figure 7:
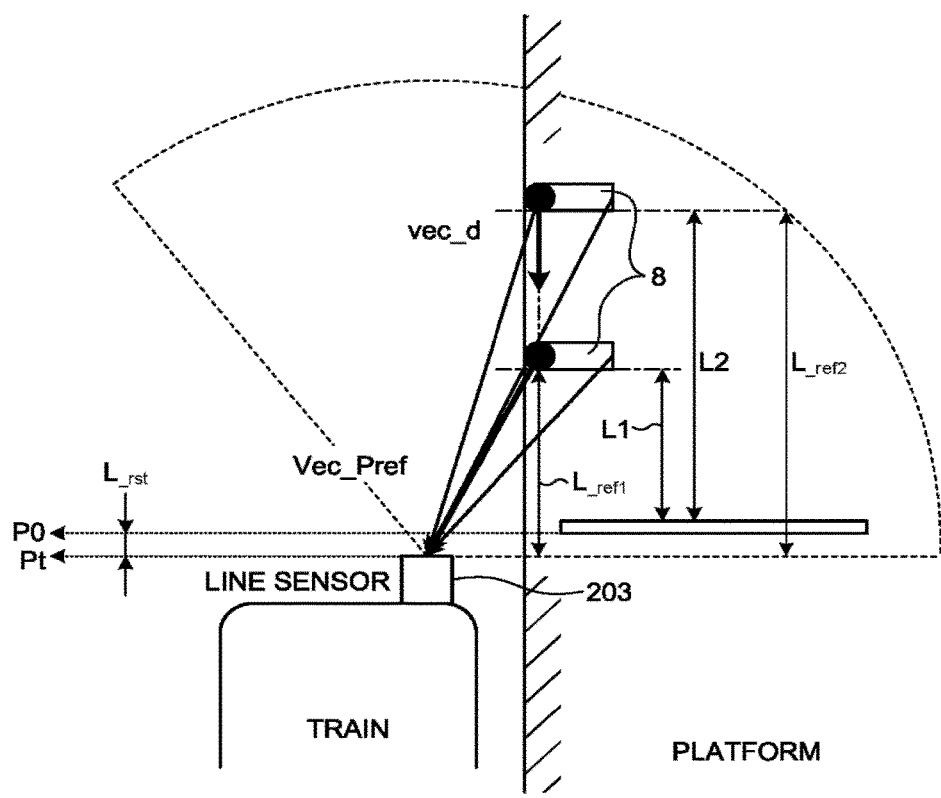
FIG. 7 is a diagram for explaining acquisition of relative distance information by a distance sensor of a relative distance measuring device of the automatic train operation system according to the first embodiment.

FIG. 7 is a diagram for explaining acquisition of a relative distance information by the distance sensor of the relative distance measuring device 203. Here, description will be made taking as an example the case where a line sensor, which can measure distances of multiple points on a one-dimensional straight line, is used as the distance sensor. First, by using the line sensor of the relative distance measuring device 203 provided in the lead car of the train 1 as shown in FIG. 1, multiple plane-shaped markers 8 provided in the station that are reference surfaces are measured to acquire distance information of multiple spots. The plane-shaped marker 8 is located at a position offset by a given distance in the traveling direction from a spot share the relative distance between the line sensor installation position and the stop target spot is zero. A straight line is fitted to a marker shape for modeling based on the previously acquired distance information of multiple spots; a normal vector vec_d toward the train is obtained from a surface containing the straight line fitted to the marker shape and the straight line in a sensor coordinate system under observation; by taking an inner product of this and a vector Vec_Pref extending to an end point of the marker 8, the distance $L\_{ref1}$ between the line sensor of the relative distance measuring device 203 and the marker 8 is computed; and the distance L1 to the marker 8 is subtracted, thereby obtaining the relative distance $L\_{rst}$. The relative distance $L\_{rst}$ takes on a positive value before reaching the target spot and a negative value after passing the target spot.

If multiple markers exist, the distance to a marker end point can be obtained for each of markers. For example, for a marker at a distance L2 from the stop point, in the same way as above, a normal vector vec_d toward the train is obtained from a surface containing the straight line fitted to the marker shape and the straight line; by taking an inner product of this and a vector Vec_Pref extending to ail end point of the marker 8, the distance $L\_{ref2}$ between the sensor and the marker 8 is computed; and the distance L2 to the marker 8 is subtracted, thereby obtaining the relative distance $L\_{rst}$. When the train stops at a station, multiple relative distances $L\_{rst}$ can be extracted from multiple markers. By averaging or filtering the multiple extracted values so as to be the relative distance $L\_{rst}$, the influence of an error in measurement can be reduced, so that accuracy in measurement can be improved.

As shown also in FIG. 8, the relative distance $L\_{rst}$ is a distance corresponding to the actual position of the train. This has the advantage that it is not affected by errors related to sliding until stopped and transponders as compared with the relative distance $L\_{rst\_mdl}$. The relative distance $L\_{rst\_mdl}$ is obtained by acquiring position information using spot information of transponders indicated, e.g., by P2, P3 and integrating the distance from information obtained by the speed generator with the position information as a reference.

FIG. 5 is a graph showing relative distances acquired using a relative distance measuring device and the distribution thereof when trial is performed multiple times. Although the expression "trial" is used, actual business operation can be instead performed. Where trial is performed N number of times, $L\_{rst\_120}$ denotes relative distance information obtained through the ith trial. Using a plurality of relative distance information $L\_{rst\_120}$ obtained, the average distance estimating unit 202 divides the sum of all distances of events by the number of events to obtain the sample average and can output the sample average, an average distance $L\_{rst\_m}$, where i is a natural number of 1 to N. Where interval estimation of a population mean $L\_{rst\_m}$ is performed, interval estimation is performed on the average distance $L\_{rst\_m}$ that is the sample average, used, and because, if the number of samples is small and interval estimation is broad, reliability is low, when the correction amount computing unit 201 uses the value of the average distance computed, the degree of correction can be adjusted by decreasing the weighting of the numerical value to be reflected through weighting.

The correction amount computing unit 201 computes a correction amount based on the average distance $L\_{rst\_m}$ obtained in this way. For example, if there is a stop point distribution in the form of a Gaussian distribution, the target position is displaced virtually off line using the this obtained average distance $L\_{rst\_m}$, obtained from actually measured relative distances. Then for the brake instruction generating unit 106 that makes the train stop with a certain error distribution, the final stop-deceleration target value is corrected by adding a deceleration correction amount Δβ to the right side of the aforementioned equation (3) using the acquired average distance $L\_{rst\_m}$. The deceleration correction amount Δβ is defined by the following equation (4) for adjusting deceleration to shift the median of the Gaussian distribution by the distance.

[Formula 4]

$$\Delta\beta = -(V_k^2 * L\_{rst\_m}) / 2L_k(L_k + L\_{rst\_m}) \qquad (4)$$

Figure 10:
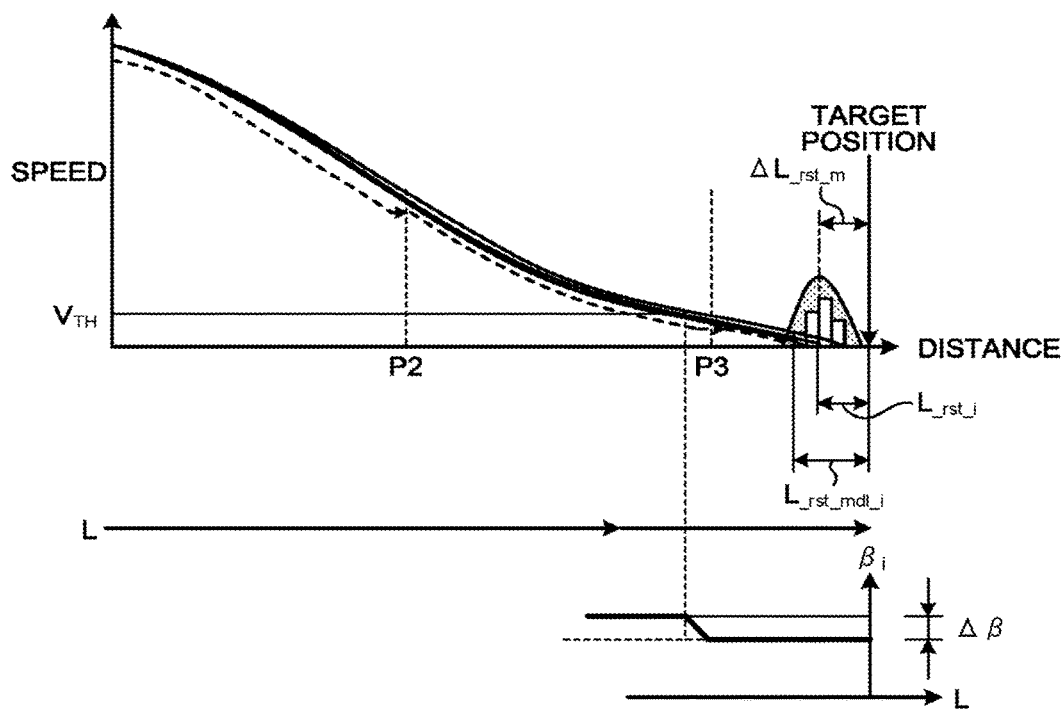
FIG. 10 is a graph showing an example correcting method according to the first embodiment.

Then the stop target point is adjusted to be a spot where the actual relative distance between the station and the train 1 is zero. FIG. 10 is a graph showing an example correcting method. FIG. 10 shows an example where correction is started at the transponder P3 spot. In this case, when spot information of the transponder P3 is corrected, accordingly target deceleration is computed using the above equation (4). As such, because correction can be applied to only computation of the final notch, only the timing of braking that determines the final stop distance can be affected without affecting the behavior immediately before. On the other hand, it is also possible to perform correction as shown by the above equation (4) across the entire brake control in order to suppress rapid fluctuation, and the specifying value correction amount can be changed according to the brake characteristics that are different for each individual brake instruction generating unit 106, to which the result of the correction amount computing unit 201 is applied. Further, since the deceleration correction amount Δβ contains division, there is risks that, when remaining distance $L_k$ becomes small, the correction amount becomes very large and that changes in deceleration become large to worsen ride quality. Accordingly, by setting an upper limit on the deceleration correction amount Δβ or setting a limit for sign inversion, excessive correction can be suppressed.

As described above, the automatic train operation system of the present embodiment includes: a relative distance measuring device that acquires information about the relative distance of a train relative to the stop position of a station to output average distance information that is the average of relative distances; and a brake control device. The brake control device includes: a sensor information holding unit that holds speed information and position information detected by sensors to output; a correction amount computing unit that computes a specifying value correction amount from the speed information, the position information, and the average distance information to output; and an instruction planning unit that computes a deceleration specifying value from the speed information, the position information, and the specifying value correction amount, that generates a notch specifying value corresponding to the deceleration specifying value, and that generates a brake specifying value from target deceleration corresponding to the notch specifying value based on the notch specifying value or a deceleration model for each notch to output to the brake device. Or the automatic train operation system for a train includes: a relative distance measuring device that acquires information about the relative distance between the stop position of a station and the train to output stop distance information; and a brake control device that outputs a brake specifying value to a brake device. The brake control device includes: a route information storage unit that outputs route information stored therein; an average distance estimating unit that estimates the population mean of the stop distance information from a plurality of stop distance information that are outputted by the relative distance measuring device to output average distance information; a sensor information holding unit that holds speed information and position information detected by sensors to output; a sensor information correcting unit that estimates the current speed and current position of the train from the speed information and the position information to output and that also outputs corrected sensor information that is information about position and speed in the future, estimated taking into account a response delay from issuing a specifying value to responding; a correction amount computing unit that computes a specifying value correction amount from the route information, the average distance information, the current speed, and the current position to output; a brake characteristic estimating unit that estimates brake characteristics from the current speed and the current position to output; a brake instruction planning unit that holds the brake characteristics and that outputs target deceleration corresponding to a notch specifying value based on a deceleration model for each notch; a brake instruction generating unit that generates a brake specifying value from the corrected sensor information, the target deceleration, and the specifying value correction amount to output; and a history storage unit that stores history information of the brake specifying values, the route information, and the corrected sensor information. According to the present embodiment, there can be provided an automatic train operation system wherein an actual stop distance is acquired by the relative distance measuring device. The correction amount computing unit 201 computes a correction amount for the brake specifying value 19 by using the average distance obtained through multiple times of acquisition of relative distance. The obtained correction amount is inputted to the brake instruction generating unit 106 to correct it. The automatic train operation system can automatically adjust the center of the variation of the brake device, which stops the train with a certain degree of variation with respect to an actual stop point, to be at a desired position, which is not achieved by the conventional techniques. Therefore, the center of the variation in the stop point due to models being indeterminate can be automatically adjusted even in the case where platform doors are applied, by which the train can be stopped at a precise position.

Second Embodiment

Figure 11:
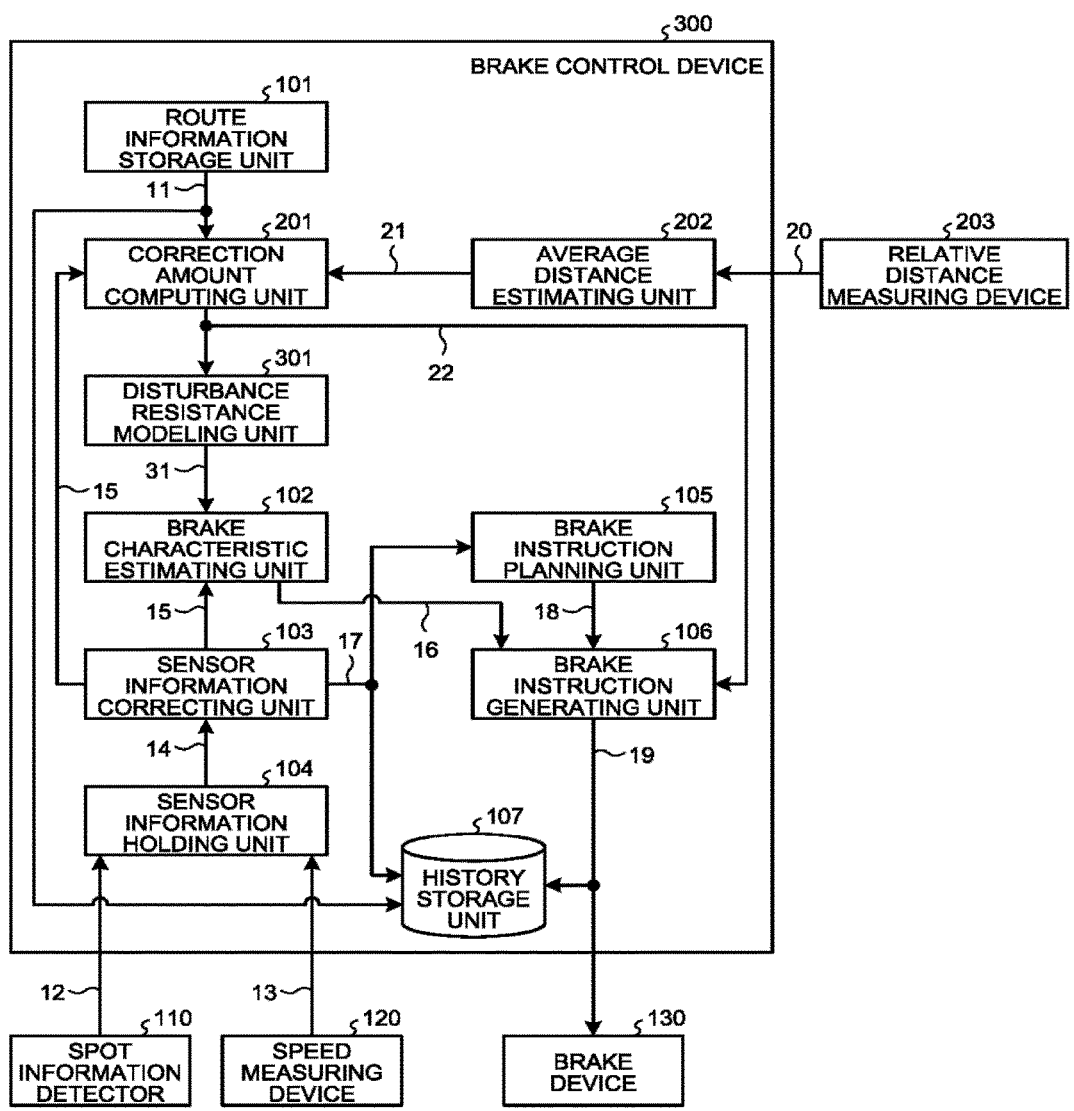
FIG. 11 is a diagram showing an example detailed configuration of an automatic train operation system according to a second embodiment.

FIG. 11 is a diagram showing an example detailed configuration of the second embodiment of an automatic train operation system according to the present invention. The automatic train operation system shown in FIG. 11 differs from that shown in FIG. 3 in that it further includes a disturbance resistance modeling unit 301 in a brake control device 300. The relative distance worth of deceleration correction amount $\Delta\beta$ defined by the equation (4) in the first embodiment is inputted to the disturbance resistance modeling unit 301. The disturbance resistance modeling unit 301 elaborates a model for $\beta_r$ using the brake specifying values 19, the speed information 13, and the position information 12 held in chronological order in the history storage unit 107.

For example, $\beta_r$ for the straight line portion of a rail track is approximated as a quadratic function. Three coefficients, i.e., a constant term, a first-order term, and a second-order term are required to define the quadratic function. However, these coefficients are often modeled by fitting obtained from runs on a flatland with no gradient. However, in reality, the fitting state changes also depending on the combination of inter-station route conditions and cars. Thus, in order to improve the stop position accuracy, the model accuracy needs to be improved by modeling $\beta_r$ locally. Especially when at low speed, the influence of the constant term is large, hence it is effective to perform fitting locally between stations in improving the stop position accuracy.

Here, by using the deceleration correction amount $\Delta\beta$ obtained previously for the correction amount of the constant term of at low speed, the model can be renewed. Train resistance model information 31 that is the deceleration expression $\beta_r$ obtained here is inputted to the brake characteristic estimating unit 102, and thus the influence of $\beta_r$ can be accurately removed, and the accuracy of the brake deceleration characteristic can be improved when computing actual deceleration using data during running. Thus, the error between the model-based brake specifying value 19 of the brake instruction generating unit 106 and actual output is reduced, so that variation in the stop spot is suppressed.

Figure 12:
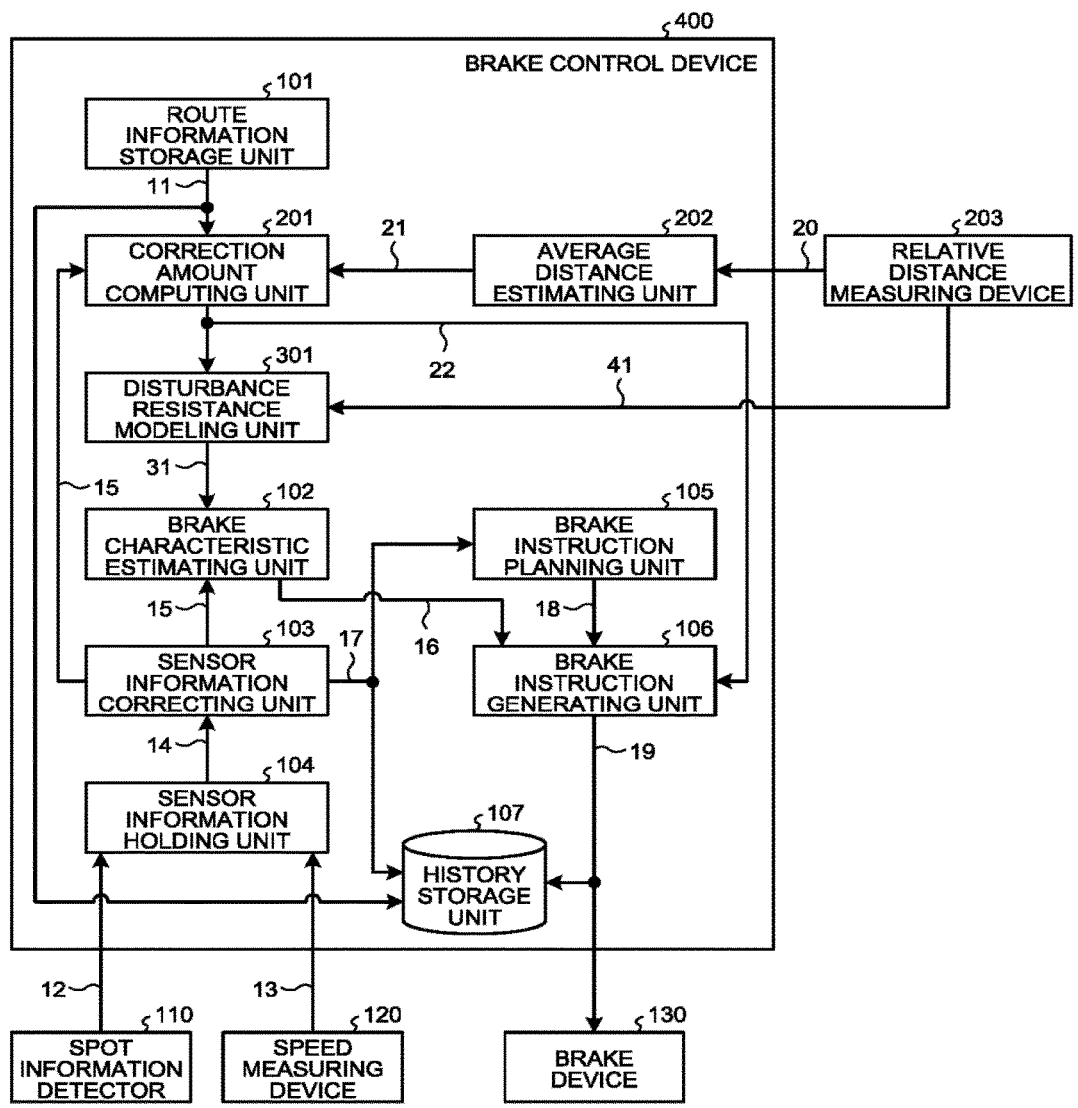
FIG. 12 is a diagram showing an example detailed configuration of the automatic train operation system according to the second embodiment.

FIG. 12 is a diagram showing an example detailed configuration of the second embodiment of an automatic train operation system according to the present invention. By using also information 41 outputted by the relative distance measuring device 203 as shown in FIG. 12, an error in position information especially just before stopped can be corrected, so that accuracy in modeling disturbance resistance can be improved.

Third Embodiment

Figure 13:
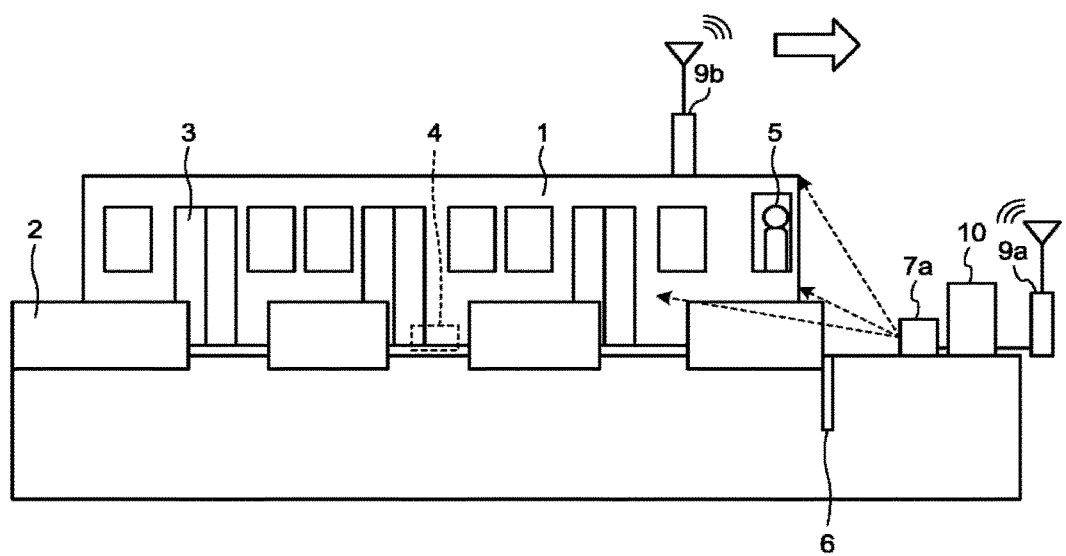
FIG. 13 is a diagram showing an example of the configuration of a train having mounted therein a brake control device applied in an automatic train operation system according to a third embodiment and the configuration of a stop station.

FIG. 13 is a diagram showing an example of the configuration of the third embodiment of a train having mounted therein a brake control device applied in an automatic train operation system according to the present invention and the configuration of a stop station. The automatic train operation system shown in FIG. 13 differs from that shown in FIG. 1 in that the train 1 includes a communication unit 9b including an antenna and that a distance measuring device 7a, an average distance estimating device 10, and a communication device 9a including an antenna are provided on the platform side. The distance measuring device 7a has a distance sensor. Relative distance information acquired by the distance measuring device 7a is sent to the average distance estimating device 10, and average distance information is transmitted to the train 1 via the communication device 9a including the antenna. The train 1 transmits and receives information to and from the communication device 9a including the antenna via the communication unit 9b including the antenna by radio.

Figure 14:
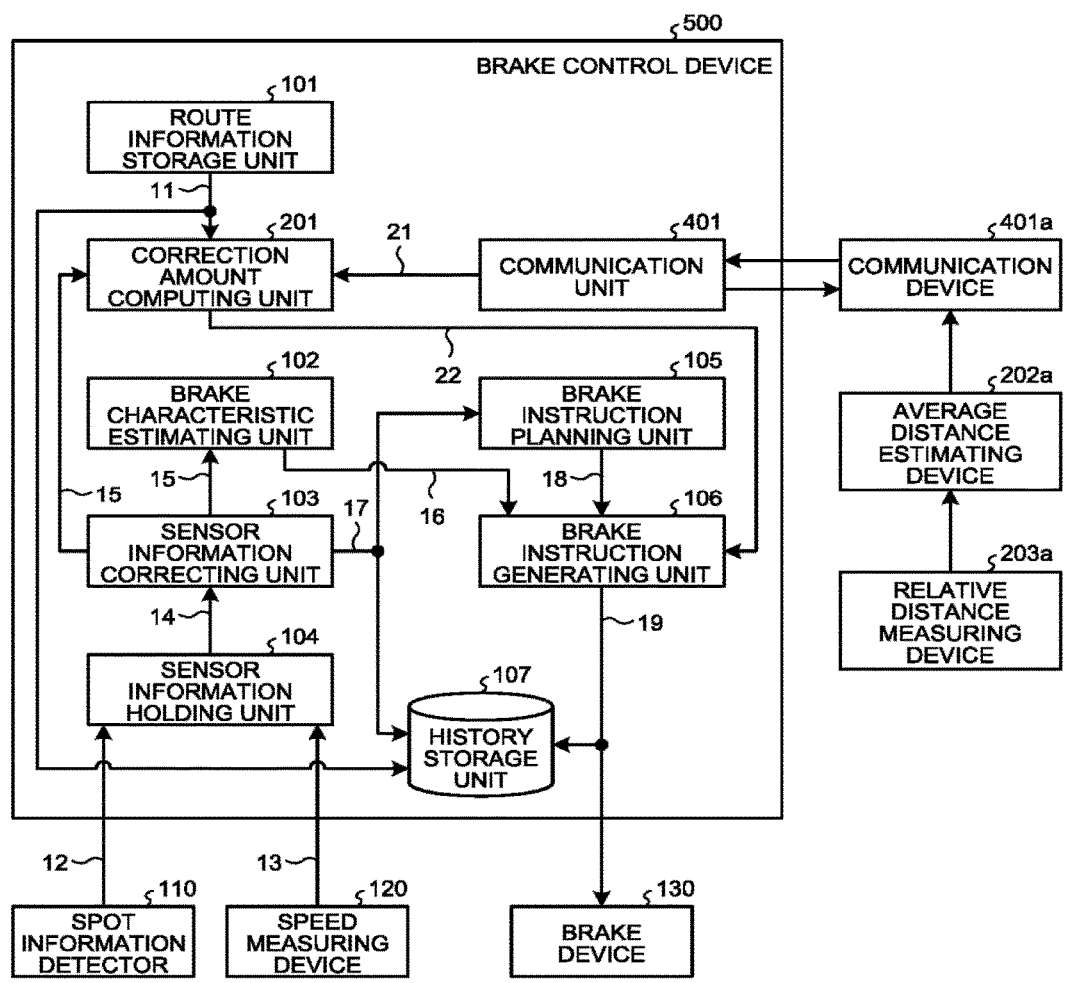
FIG. 14 is a diagram showing the detailed configuration of the automatic train operation system according to the third embodiment.

FIG. 14 is a diagram showing an example detailed configuration of the third embodiment of an automatic train operation system according to the present invention. The automatic train operation system shown in FIG. 14 differs from that of FIG. 3 in that its brake control device 500 has a communication unit instead of the average distance estimating unit. The communication unit 401 corresponds to the communication unit 9b including the antenna shown in FIG. 13. Further, the automatic train operation system shown in FIG. 14 includes a communication device 401a, an average distance estimating device 202a, and a relative distance measuring device 203a on the ground side. The communication device 401a corresponds to the communication device 9a including the antenna. The average distance estimating device 202a corresponds to the average distance estimating device 10. The relative distance measuring device 203a corresponds to the distance measuring device 7a.

The present embodiment is premised on, for example, a railroad car system including a radio device of communication based train control (CBTC). The measuring system is installed in the station on the ground side, not on board.

In the automatic train operation system of the present embodiment, the relative distance measuring device is placed in the station on the ground side. Relative distance information outputted by the relative distance measuring device is transmitted to the average distance estimating device. Average distance information outputted by the average distance estimating device is transmitted to the correction amount computing unit by radio. According to the present embodiment, if the number of cars exceeds the number of platforms, or the system is configured such that maintenance is performed thereon together with platform barriers, maintenance is easy, and cost can be reduced.

Fourth Embodiment

Figure 15:
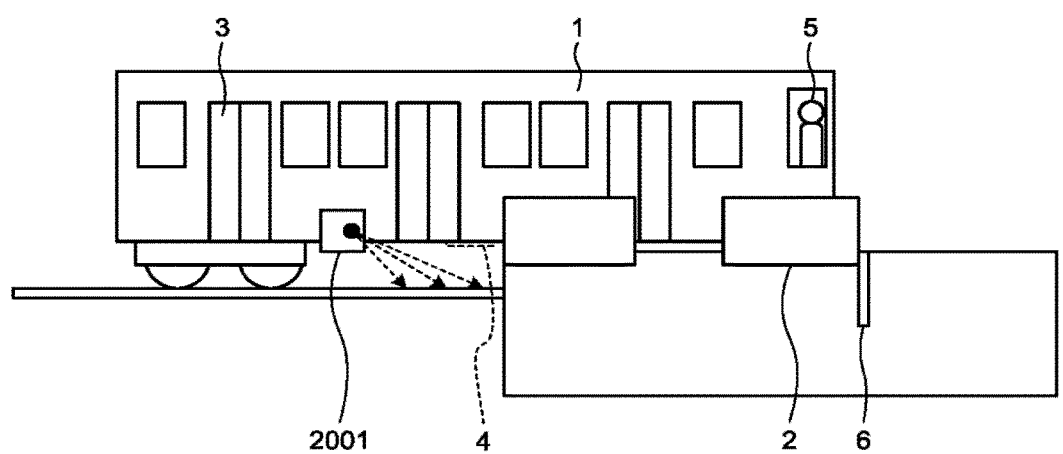
FIG. 15 is a diagram showing an example of the configuration of a train having mounted therein a brake control device applied in an automatic train operation system according to a fourth embodiment and the configuration of a stop station.

FIG. 15 is a diagram showing an example of a configuration of the fourth embodiment of a train having mounted therein a brake control device applied in an automatic train operation system according to the present invention and the configuration of a stop station. The automatic train operation system shown in FIG. 15 differs from that shown in FIG. 1 in that the train 1 includes a non-contact measuring device 2001 instead of the distance measuring device.

Figure 16:
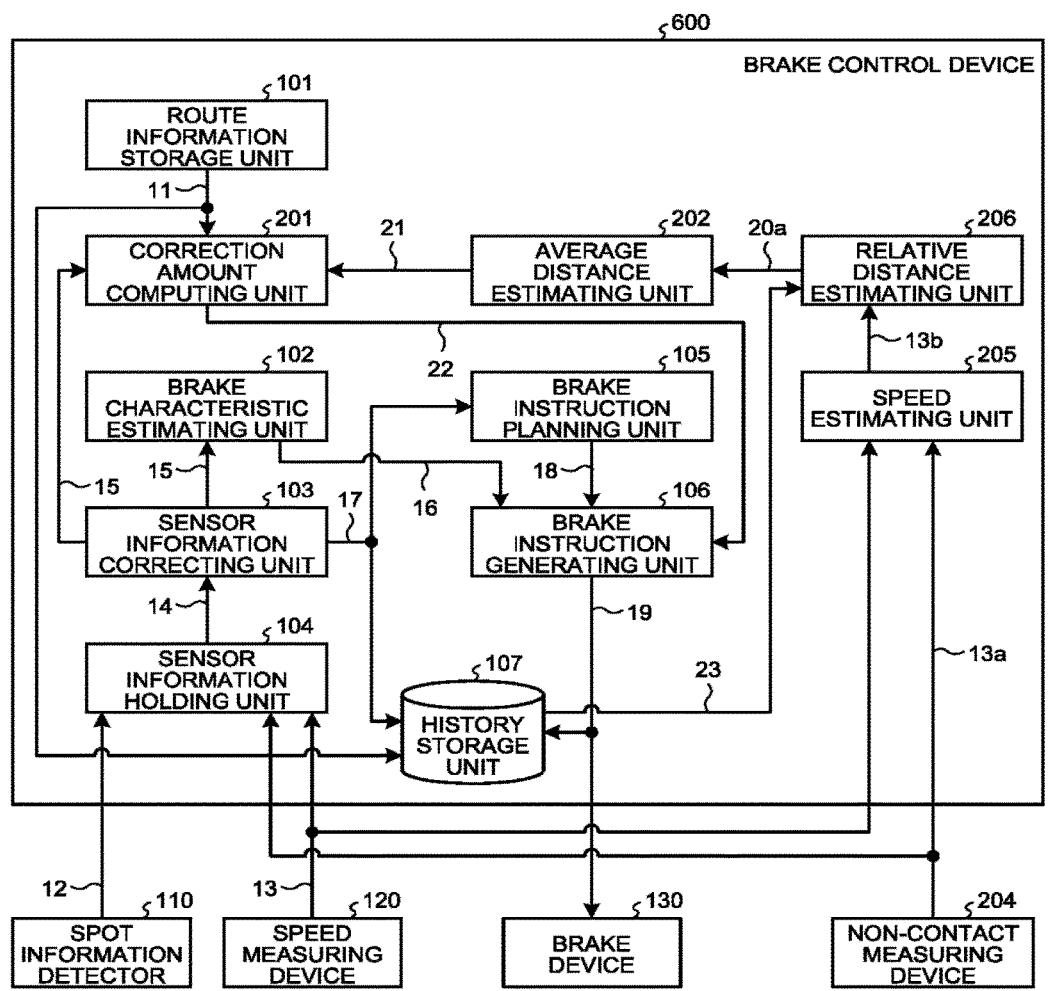
FIG. 16 is a diagram showing the detailed configuration of the automatic train operation system according to the fourth embodiment.

FIG. 16 is a diagram snowing an example detailed configuration of the fourth embodiment of an automatic train operation system according to the present invention. The automatic train operation system shown in FIG. 16 differs from that of FIG. 3 in that its brake control device 600 has a speed estimating unit 205 and a relative distance estimating unit 206. The non-contact measuring device 204 corresponds to the non-contact measuring device 2001 shown in FIG. 15.

In the automatic train operation system of the present embodiment, a train includes a non-contact measuring device. The system includes a speed estimating unit to which speed information and non-contact speed information from the non-contact measuring device are inputted. The average distance estimating unit estimates the population mean of the stop distance information from a plurality of stop distance information outputted by the speed estimating unit, so as to output average distance information. In the configuration of the present embodiment, using the non-contact measuring device having a non-contact speed sensor, the difference between the current spot and the target spot is obtained from an integrated value of the speed sensors. As described in the first embodiment, the stop distance can be computed likewise from a combination of a speed generator and spot information from a transponder. However, accurate estimation is generally difficult because of sliding, an error in the wheel diameter, that is, the difference between a for-computation model wheel diameter and an actual wheel diameter, and an error in spot information. Accordingly, as shown in FIG. 16, the non-contact measuring device 204 is installed. By using the outputs from two speed sensors, that is, the speed information 13 from the speed measuring device 120 and speed information 13a that is non-contact speed information from the non-contact measuring device 204, the speed estimating unit 205 estimates a speed estimated value 13b without sliding and outputs the speed estimated value 13b. The relative distance estimating unit 206 estimates stop distance information 20a from the brake specifying values, information 23 about the spot closest to the stop point, and an integrated value of the speed estimated value 13b acquired from the history storage unit 107. The relative distance estimating unit 206 outputs the stop distance information 20a to the average distance estimating unit 202, as an alternative to the output of a relative distance sensor, so that the influence of sliding and an error in the wheel diameter can be suppressed.

Fifth Embodiment

Figure 17:
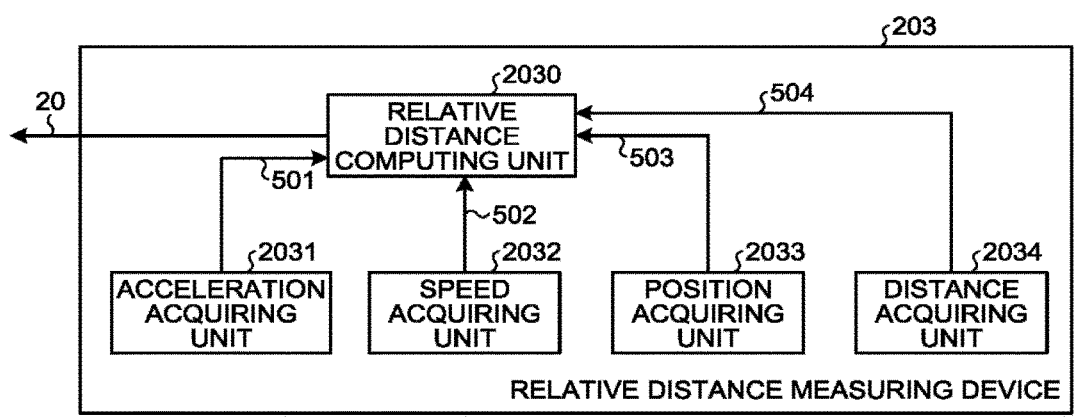
FIG. 17 is a diagram showing the detailed configuration of the relative distance measuring device in a fifth embodiment.

The present embodiment describes a relative distance measuring device provided in the automatic train operation system according to the present invention. FIG. 17 is a diagram showing a detailed configuration of the relative distance measuring device in the fifth embodiment of an automatic train operation system according to the present invention. The relative distance measuring device 203 shown in FIG. 17 computes the relative distance between the position of a train and the position of a station by using information obtained from one or more sensors. Specifically, the relative distance measuring device 203 shown in FIG. 17 includes: a relative distance computing unit 2030; an acceleration acquiring unit 2031; a speed acquiring unit 2032; a position acquiring unit 2033; and a distance acquiring unit 2034. Acceleration information 501 acquired by the acceleration acquiring unit 2031, speed information 502 acquired by the speed acquiring unit 2032, position information 503 acquired by the position acquiring unit 2033, and distance information 504 acquired by the distance acquiring unit 2034 are inputted to the relative distance computing unit 2030. The relative distance computing unit 2030 computes the relative distance between the position of a train and the position of a station using part or all of the acceleration information 501, speed information 502, position information 503, and distance information 504. The computation of the relative distance by the relative distance computing unit 2030 is specifically the computation of the distance between the stop target point of the station and the reference position of the train. More specifically, information about a position in a reference coordinate system represented by a world coordinate system is computed using sensor data, and using this position information, the distance between the stop target point of the station and the reference position of the train is computed.

As an example of the position acquiring unit 2033, a photoelectric sensor can be cited. This photoelectric sensor detects a position which the train passes and outputs as position information 503 to the relative distance computing unit 2030. This photoelectric sensor detects passing a reference spot, which is the installation position whose distance from the stop point is known. The reference spot is one whose distance from the stop point of the station is known in advance. Of the sensor, the light-receiving portion may be installed on the ground side, or the light-emitting portion may be installed, but the spot on the ground side which to pass is located at a spot whose distance is known. By using time information, acceleration information 501, speed information 502, position information 503, and distance information 504, the relative distance of the train when stopped can be computed. Specifically, the photoelectric sensor is installed at a distance, which is known in advance, from the stop target point of the station. A movement amount of the train is computed from changes in speed and time after passing this installation point of the photoelectric sensor. Finally, the position of the train relative to the stop target point of the station is computed, by which the relative distance of the train when stopped can be computed.

Thus, in a case where the current position of the train is estimated or computed by using acceleration information 501 and speed information 502, the installation position and initial position of the sensor are important. The installation position and initial position of the sensor may be recorded as prior information and design information or acquired by estimation using SLAM (Simultaneous Localization And Mapping).

In a case where an acceleration sensor corresponding to the acceleration acquiring unit 2031, a speed sensor corresponding to the speed acquiring unit 2032, and a position sensor corresponding to the position acquiring unit 2033 are used, the relative distance computing unit 2030 computes the reference position of the train on the reference coordinate system and the position on the coordinate system of the stop target point of the station in order to compute the distance between the reference position of the train and the stop target point of the station. The distance is computed from the Pythagorean theorem by using the computed positions on the reference coordinate system.

These various sensors are installed on the ground side of a position at which the position relation between the stop target point of the station and the position sensor can be acquired as measurement or design information. In another embodiment, these various sensors are installed at positions where the position relation with respect to the reference position of the lead car or each car can be acquired as measurement or design information. The position sensor may be installed on the ground side or may be on the on-board side. If the position sensor is installed on the ground side, it is installed at a known distance from the stop point. And, if the position sensor is installed on the on-board side, it is installed at a position on the car side which is desired to be in accordance with the stop point, for example, at a known distance from the body front.

As the position sensor, there can be cited a motion tracker that measures a marker with a camera to compute coordinates from the shape and size thereof, a laser tracker using a laser likewise, a measuring instrument that computes from displacement of joints of a link structure, or a receiver of a GPS (Global Positioning System).

As the speed sensor which may be installed aboard a car of a train, on the ground between stations, or in a station and can measure the movement speed of the train relative to the ground, there can be cited a non-contact speed sensor using a Doppler radar method.

As the acceleration sensor which can measure the acceleration of the train relative to the ground when moving, there can be cited an acceleration sensor of a distortion gauge method.

Note that these various sensors are examples and are not intended to be limited to those mentioned above.

In the present embodiment, when relative distance measurement using a laser is difficult as when a dense fog occurs, by combining a means other than light, relative distance information can be acquired from a combination of a plurality of sensor information. With this configuration, the adverse influence on accuracy in measurement especially due to weather variation can be reduced.

The relative distance measuring device described in the present embodiment: acquires position information of a train relative to the stop position of a station; acquires at least one of the speed and acceleration of the train relative to the stop position of the station; and computes information about the relative distance between the stop position of the station and the train with the position information as a reference, so as to output average distance information.

The configurations shown in the above embodiments show examples of the content of the present invention and may be combined with other well-known techniques, and parts of the configurations may be omitted or changed without departing from the spirit of the invention.

INDUSTRIAL APPLICABILITY

As described above, the automatic train operation system according to the present invention is useful for a case where it is required to stop a train at a stop target position with high accuracy and especially suitable for a case where platform doors are provided in a stop station.

REFERENCE SIGNS LIST

1 train, 2 platform door, 3 door, 4, 200, 300, 400, 500, 600, 1000 brake control device, 5 driver, 6 stop reference position, 7, 7a distance measuring device, 8 marker, 9a communication device, 9b communication unit, 10 average distance estimating device, 11 route information, 12 position information, 13, 13a speed information, 13b speed estimated value, 14 sensor information, 15 current state amount, 16 brake characteristic, 17 corrected sensor information, 18 planned specifying value, 19 brake specifying value, 20, 20a stop distance information, 21 average distance information, 22 specifying value correction amount, 23 spot information, 31 train resistance model information, 41 information, 101 route information storage unit, 102 brake characteristic estimating unit, 103 sensor information correcting unit, 104 sensor information holding unit, 105 brake instruction planning unit, 106 brake instruction generating unit, 107 history storage unit, 110 spot information detector, 120 speed measuring device, 130 brake device, 201 correction amount computing unit, 202 average distance estimating unit, 202a average distance estimating device, 203, 203a relative distance measuring device, 204, 2001 non-contact measuring device, 205 speed estimating unit, 206 relative distance estimating unit, 301 disturbance resistance modeling unit, 401 communication unit, 401a communication device, 1001 instruction planning unit, 501 acceleration information, 502 speed information, 503 position information, 504 distance information, 2030 relative distance computing unit, 2031 acceleration acquiring unit, 2032 speed acquiring unit, 2033 position acquiring unit, 2034 distance acquiring unit.

The invention claimed is:

1. An automatic train operation system comprising:
   relative distance measuring circuitry configured to acquire information about a relative distance between a train and a stop target position at a time when the train is stopped to output average distance information that is an average of the information about the relative distances obtained by stops of the train in a plurality of times of operations; and
   brake control
   circuitry configured:
      to hold and output speed information and position information detected by sensors;
      to automatically compute a specifying value for correcting a deceleration from the speed information, the position information, and the average distance information to output the specifying; value, the specifying value being used after next time of stopping the train; and to generate a brake specifying value based on the speed information, the position information, and the specifying value for correcting the deceleration, so as to output the brake specifying value to a brake.

2. An automatic train operation system for a train comprising:

relative distance measuring circuitry configured to acquire information about a relative distance between a train and a stop target position at a time when the train is stopped to output stop distance information; and brake control circuitry to output a brake specifying value to a brake, the brake control circuitry configured:

to output route information stored therein;

to estimate a population mean of the stop distance information from a. plurality of stop distance information that are acquired at a plurality of times of the stops of the train and are outputted by the relative distance measuring circuitry, so as to output average distance information;

to hold speed information and position information detected by sensors to output;

to estimate and output the current speed and current position of the train from the speed information and the position information and to output corrected sensor information that is information about position and speed in the future, estimated taking into account a response delay from issuing a specifying value to responding;

to automatically compute a specifying value for correcting a deceleration from the route information, the average distance information, the current speed, and the current position to output the specifying value correction amount, the specifying value being used after next time of stopping the train;

to estimate brake characteristics from the current speed and the current position to output the brake characteristics;

to hold the brake characteristics and to output target deceleration corresponding to a notch specifying value based on a deceleration model for each notch;

to generate a brake specifying value from the corrected sensor information, the target deceleration, and the specifying value for correcting the deceleration, so as to output the brake specifying value; and to store history information of the brake specifying values, the route information, and the corrected sensor information.

3. The automatic train operation system according to claim 2, the circuitry further configured:

to elaborate a model for deceleration attributed to train resistance using the brake specifying values, the speed information, and the position information that is stored in chronological order.

4. The automatic train operation system according to claim 2, wherein the relative distance measuring circuitry is placed in a station on a ground side, and the average distance information outputted by the relative distance measuring circuitry is transmitted to the brake control circuitry by radio.

5. The automatic train operation system according to claim 2, wherein the train is provided with non-contact measuring circuitry, wherein the system inputs to the brake control circuitry the speed information and non-contact speed information from the non-contact measuring circuitry, and wherein the brake control circuitry estimates a population mean of the stop distance information from a plurality of stop distance information that are outputted to output the average distance information.

6. The automatic train operation system according to claim 2, wherein the relative distance measuring circuitry:

acquires information about the position of the train relative to the stop position of a station;

acquires at least one of the speed and acceleration of the train relative to the stop target position;

computes information about a relative distance between the stop target position and the train with the position information as a reference to output the average distance information.

7. The automatic train operation system according to claim 1, wherein the circuitry is further configured to:

compute a deceleration specifying value from the speed information, the position information, and the specifying value for correcting the deceleration;

generate a notch specifying value corresponding to the deceleration specifying value; and generate a brake specifying value from target deceleration corresponding to the notch specifying value based on the notch specifying value or deceleration model for each notch.

8. A brake controller used for an automatic train operation system including relative distance measuring circuitry to acquire information about a relative distance between a train and a stop target position at a time when the train is stopped to output average distance information that is an average of the information about the relative distances obtained by stops of the train in a plurality of times of operations, the brake controller including circuitry configured:

to hold and output speed information and position information detected by sensors;

to automatically compute a specifying value for correcting a deceleration from the speed information, the position information, and the average distance information and output the specifying value, the specifying value being used after next time of stopping the train; and to generate a brake specifying value based on the speed information, the position information, and the specifying value for correcting the deceleration, so as to output the brake specifying value to a brake.

* * * * *